United States Patent
Yamashita et al.

[11] Patent Number: 5,426,951
[45] Date of Patent: Jun. 27, 1995

[54] AIR CONDITIONING APPARATUS WITH CROSS CONTROL MEANS THEREIN

[75] Inventors: Tetsuji Yamashita; Yasuhiro Arai; Morio Hirahara, all of Kanagawa, Japan

[73] Assignee: Kabushiki Kaisha Toshiba, Kawasaki, Japan

[21] Appl. No.: 193,996

[22] Filed: Feb. 9, 1994

[30] Foreign Application Priority Data

Feb. 18, 1993 [JP] Japan .................. 5-028935

[51] Int. Cl.$^6$ .................. B01F 3/02; F25B 49/00
[52] U.S. Cl. .................. 62/176.6; 62/181; 236/44 C; 236/78 D
[58] Field of Search .................. 236/78 D, 44 C; 62/176.6, 203, 181

[56] References Cited

U.S. PATENT DOCUMENTS

| | | | |
|---|---|---|---|
| 4,889,280 | 12/1989 | Grald et al. | 62/176.6 X |
| 5,062,276 | 11/1991 | Dudley | 62/176.6 |
| 5,231,845 | 8/1993 | Sumitani et al. | 62/160 |

FOREIGN PATENT DOCUMENTS 63-29155  2/1988  Japan .

*Primary Examiner*—William E. Wayner
*Attorney, Agent, or Firm*—Foley & Lardner

[57] ABSTRACT

An air conditioning apparatus by which the air conditioning apparatus is controlled with optimal respondency and stability so as to enjoy indoor-space comfortability. The air conditioning apparatus for use with cycle dry, includes: an outdoor heat exchanger; a fan unit for blowing air to the outdoor heat exchanger; an adjusting portion, connected to the outdoor heat exchanger, for adjusting flow rate of refrigerant; a first indoor heat exchanger and a second heat exchanger connected to the adjusting means; a compressor which is connected both to the indoor heat exchanger and the outdoor heat exchanger, and which is controllable by an inverter unit; a detecting portion for detecting temperature and humidity indoors; and a cross control system for determining rotation frequencies of the fan unit and the inverter unit by comparing data obtained from the detecting portion with predetermined values of temperature and humidity indoors.

5 Claims, 7 Drawing Sheets

5,426,951

AIR CONDITIONING APPARATUS WITH CROSS CONTROL MEANS THEREIN

BACKGROUND OF THE INVENTION

1. Technical Field

The present invention relates to an air conditioning apparatus and it particularly relates to controlling means thereof.

2. Background Art

In the conventional air conditioning apparatus constituting a cycle dry (cooling cycle) where two indoor heat exchangers are provided serving as a condensor and an evaporator, a rotation frequency of an outdoor fan is operated so that an indoor temperature is controlled, whereas the rotation frequency of a compressor is operated so that an indoor humidity is controlled. Accordingly, the indoor temperature and the indoor humidity are independently controlled.

However, when the rotation frequency of the outdoor fan is operated, not only the indoor temperature but also the indoor humidity is changed. Similarly, when the rotation frequency of the compressor is operated, not only the indoor humidity also the indoor temperature are changed. Therefore, the conventional air conditioning apparatus can not realize a desirable stable control. Since fluctuation of temperature and humidity is undesirably large against a target temperature and humidity, comfortability is lost.

SUMMARY OF THE INVENTION

In view of the foregoing drawbacks, it is therefore an object of the present invention to provide an air conditioning apparatus including control means by which the air conditioning apparatus is controlled with optimal respondency and stability so as to enjoy indoor-space comfortability.

To achieve the object, there is provided an air conditioning apparatus for use with cycle dry, comprising: an outdoor heat exchanger; fan means for blowing air to the outdoor heat exchanger; adjusting means, connected to the outdoor heat exchanger, for adjusting flow rate of refrigerant; a first indoor heat exchanger and a second heat exchanger connected to the adjusting means; compressing means which is connected both to the indoor heat exchanger and the outdoor heat exchanger, and which is controllable by an inverter unit; detecting means for detecting temperature and humidity indoors; and cross control means for determining rotation frequencies of the fan means and the inverter unit by comparing data obtained from the detecting means with predetermined values of temperature and humidity indoors.

For a primarily window-mounting type, there is also provided an air conditioning apparatus, comprising: a heat exchanger; fan means for blowing air to the heat exchanger; adjusting means, connected to the heat exchanger, for adjusting flow rate of refrigerant; compressing means which is connected to the heat exchanger, and which is controllable by an inverter unit; detecting means for detecting temperature and humidity indoors; and control means for determining rotation frequencies of the fan means and the inverter unit by comparing data obtained from the detecting means with predetermined values of temperature and humidity indoors.

BRIEF DESCRIPTION OF THE DRAWINGS

These and other objects, features and advantages of the present invention will become more apparent from the following description of the preferred embodiment taken in conjunction with the accompanying drawings, in which.

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings.

Figure 1:
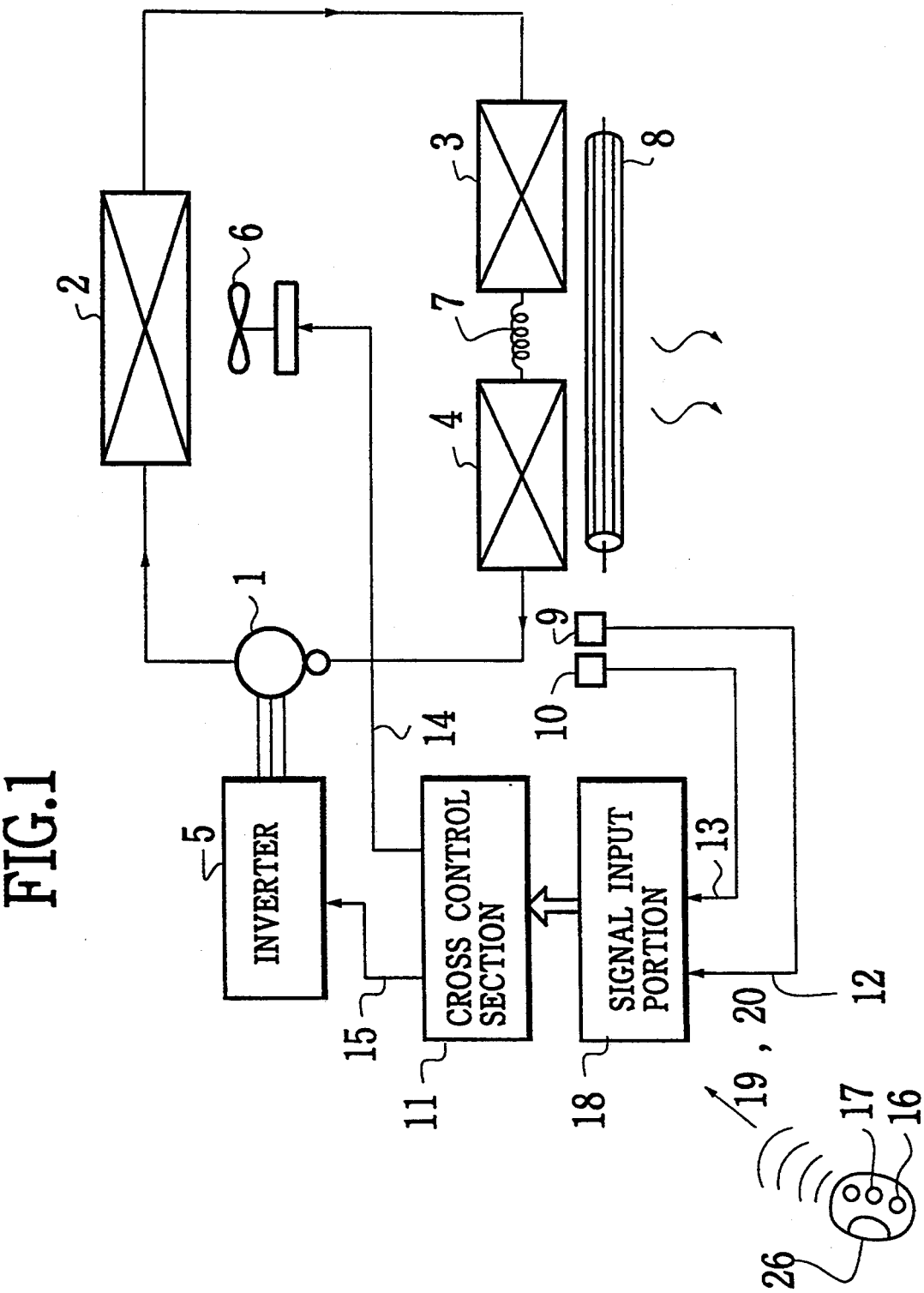
FIG. 1 is a simplified diagram showing a control system for an air conditioning apparatus according to the present invention.

FIG. 1 is a simplified diagram showing a control system for an air conditioning apparatus according to the present invention.

The air conditioning apparatus constitutes a cooling cycle for cycle dry. Referring to FIG. 1, the air conditioning apparatus comprises:

(1) compressor 1;
(2) outdoor heat exchanger 2;
(3) first indoor heat exchanger 3 which is provided in an indoor section and functions as a condensor;
(4) second indoor heat exchanger 4 which is provided in the indoor section and functions as an evaporator;
(5) rotation frequency control means for the compressor 5;

(6) outdoor fan 6;
(7) expansion valve 7;
(8) indoor fan 8;
(9) indoor temperature detecting means 9 for detecting an indoor temperature;
(10) indoor humidity detecting means 10 for detecting an indoor humidity;
(11) cross control means or decoupling control means 11 which calculates an optimal control signal for outdoor-fan rotation frequency 14 and an optimal control signal for compressor rotation frequency 15, and respective signals 14, 15 are sent to outdoor fan 6 and rotation frequency control means for the compressor 5 so as to control the air conditioning apparatus;
(12) indoor temperature signal 12;
(13) indoor humidity signal 13;
(14) control signal for outdoor-fan rotation frequency 14;
(15) control signal for compressor rotation frequency 15;
(16) indoor-temperature setting means 16 provided in a remote control unit; and
(17) indoor-humidity setting means 17 provided in the remote control unit.

With reference to FIGS. 2–6, techniques for optimally controlling the air conditioning apparatus will be described in detail.

Figure 2:
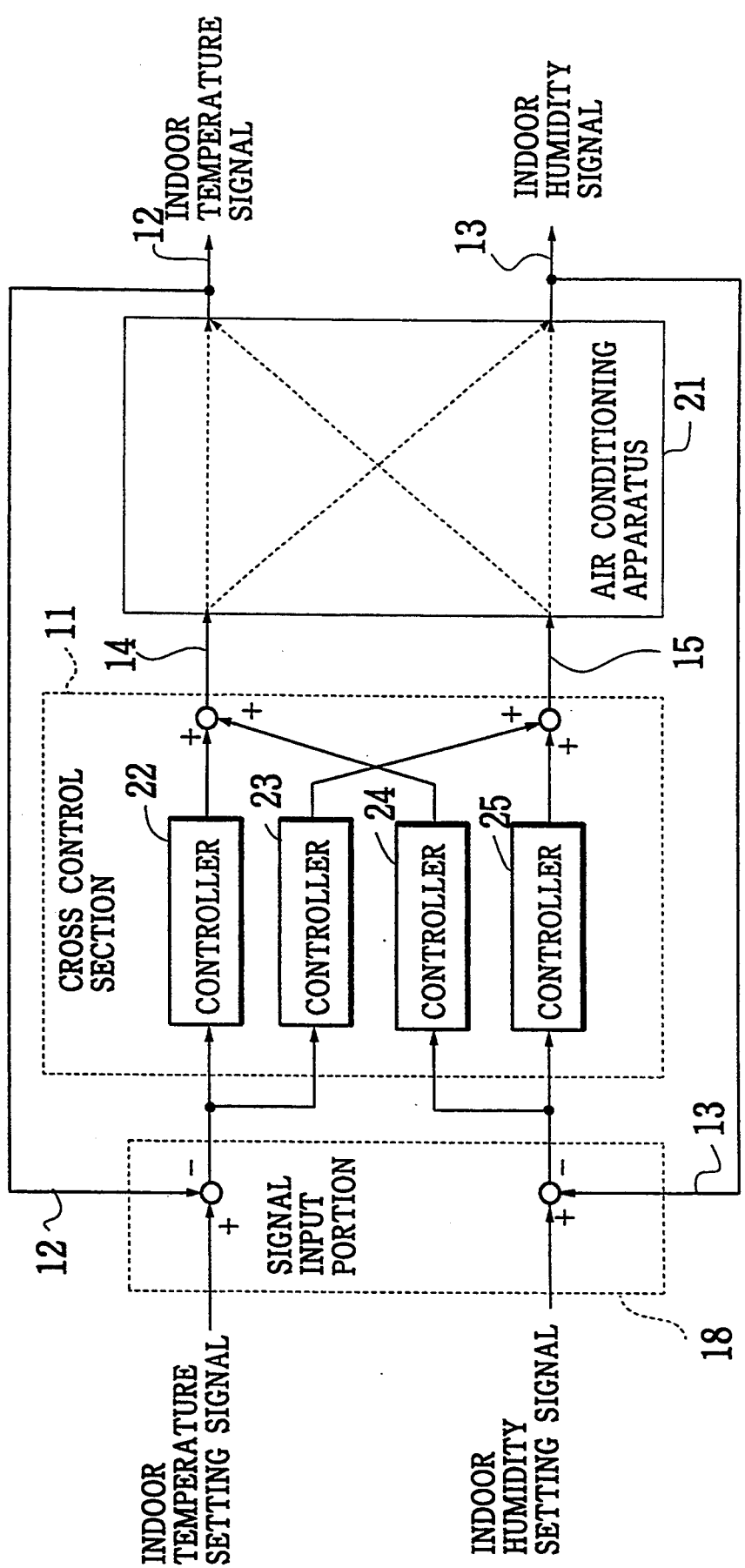
FIG. 2 is a block diagram especially showing the cross control means 11 shown in FIG. 1.

FIG. 2 is a block diagram especially showing the cross control means 11 shown in FIG. 1.

Referring to FIG. 2, the reference numeral 18 is a signal input portion connected to cross control means 11. The reference numeral 19 (see FIG. 1) indicates an indoor-temperature setting signal. The reference numeral 20 (see FIG. 1) indicates an indoor-humidity setting signal. The reference numeral 21 designates the air conditioning apparatus. The reference numerals 22 through 25 are controllers constituting the cross control means 11. Indoor-temperature setting signal 19 set by indoor-temperature setting means 16, indoor temperature signal 12 detected by indoor-temperature detecting means 9, indoor-humidity setting signal 20 set by indoor-humidity setting means 17 and indoor-humidity signal 13 detected by indoor-humidity detecting means 10 are input to signal input portion 18.

Note that indoor temperature signal 12 and indoor-humidity signal 13 are also input to signal input portion 18 in a feedback manner to realize a real time correspondence between cross control means 11 and detected data on indoor temperature and humidity.

Indoor-temperature setting signal 19 and indoor temperature signal 12 are compared, and indoor-humidity setting signal 20 and indoor humidity signal 13 are compared. Then, compared values are processed in cross control means 11. As a result thereof, output therefrom are control signal for outdoor-fan rotation frequency 14 and control signal for compressor rotation frequency 15. The control signal 14 optimally controls outdoor fan 6. The control signal 15 optimally controls compressor through an inverter unit 5 which controls the frequency of the compressor 1.

Figure 4A:
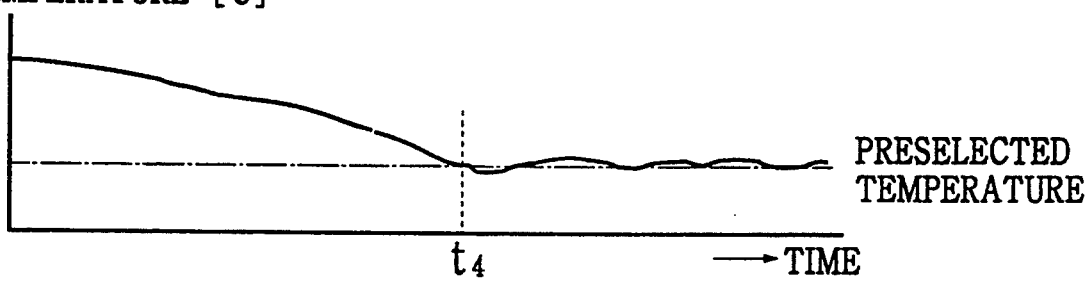
FIG. 4A and FIG. 4B shows changes of the indoor temperature and humidity when the air conditioning apparatus is controlled in the cross-control manner.
Figure 4B:
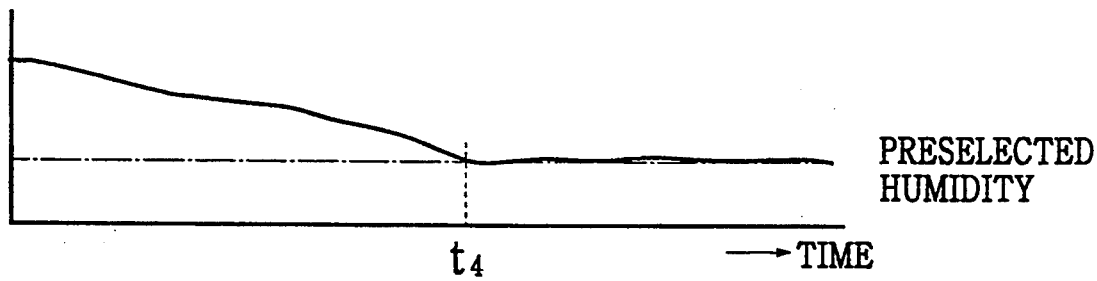
Figure 5A:
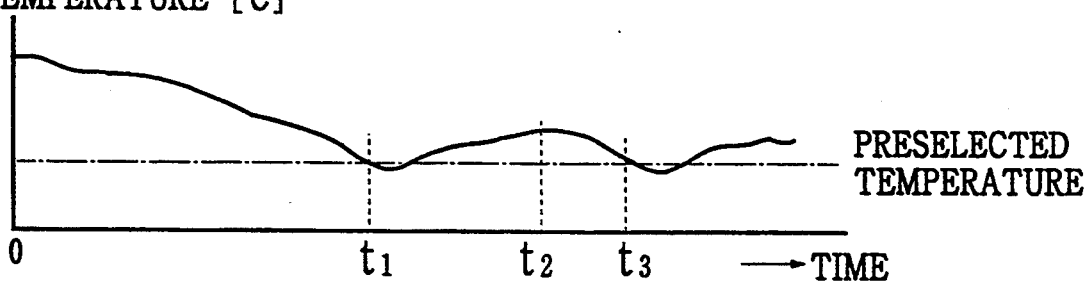
FIG. 5A and FIG. 5B show the changes of the indoor temperature and humidity when the conventional air conditioning apparatus is controlled in a conventional temperature-priority manner, so as to compare the characteristics of the conventional apparatus with the present invention's shown in FIG. 4A and FIG. 4B.
Figure 5B:
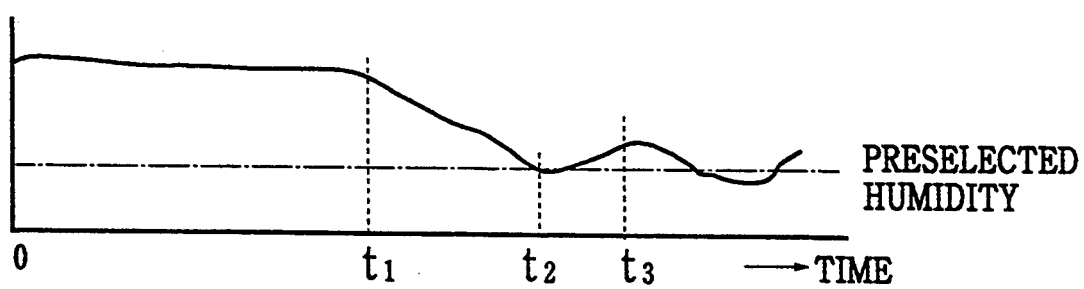

FIG. 4A and FIG. 4B show changes of the indoor temperature and humidity when the air conditioning apparatus is controlled in the above-mentioned manner. FIG. 5A and FIG. 5B show the changes of the indoor temperature and humidity when the conventional air conditioning apparatus is controlled in a conventional temperature-priority manner, so as to compare the characteristics of the conventional apparatus with the present invention's shown in FIG. 4A and FIG. 5B.

Figure 6A:
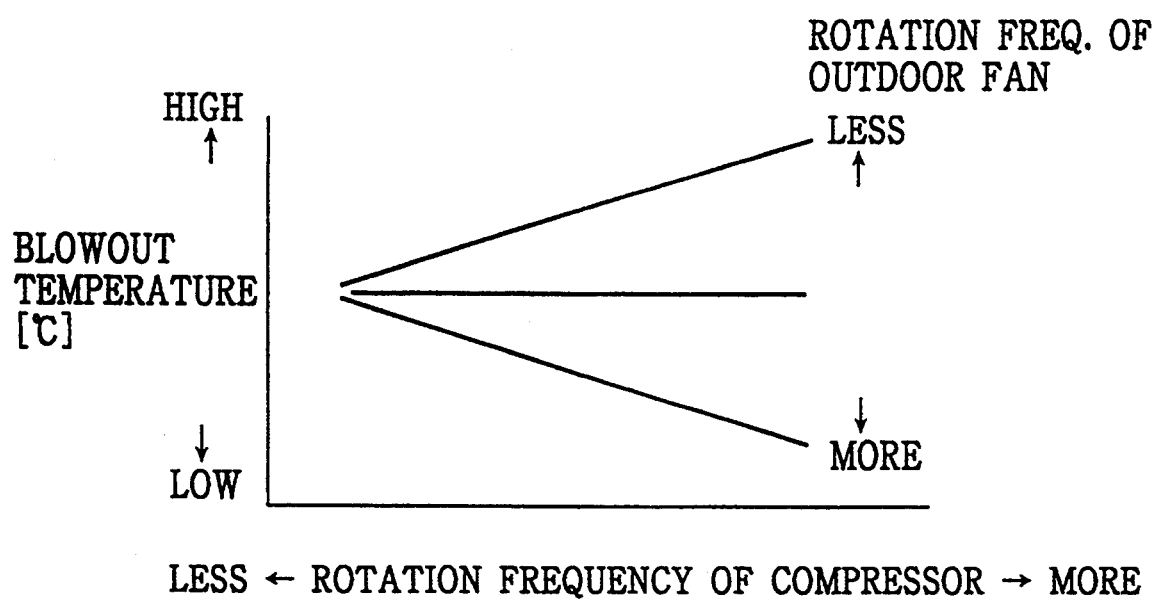
FIG. 6A and FIG. 6B show characteristics where tile rotation frequencies of the outdoor fan and compressor vary under a constant condition of air atmosphere utilizing a system configuration shown in FIG. 1 and when the temperature and humidity of air blown out of the indoor-unit fan are stabilized.
Figure 6B:
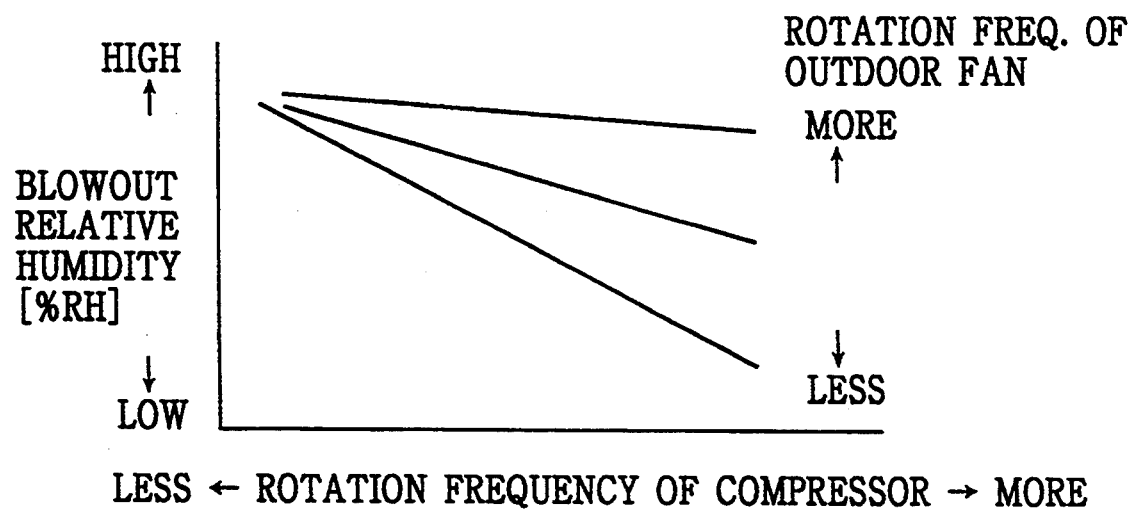

FIG. 6A and FIG. 6B show characteristics where the rotation frequencies of the outdoor fan and compressor vary under a constant condition of air atmosphere utilizing a system configuration shown in FIG. 1 and when the temperature and humidity of air blown out of the indoor-unit fan are stabilized.

With reference to FIGS. 6A and 6B, suppose that a certain compressor frequency is in question. If the rotation frequency of the outdoor fan is increased (LESS to MORE in FIG. 6B), the blowout relative humidity becomes high (LOW to HIGH in FIG. 6B). Simultaneously when the rotation frequency of outdoor fan is increased (LESS to MORE in FIG. 6A), the blowout temperature becomes low (HIGH to LOW in FIG. 6A). The characteristics explained above with FIG. 6A and FIG. 6B illustrate an inherent interference phenomenon.

The conventional example of FIGS. 5A and 5B will be described with reference to FIGS. 6A and 6B. In this conventional example shown in FIGS. 5A and FIG. 5B, there are not used controllers 23 and 24 by which the cross control is implemented.

Referring to FIGS. 5A and 5B, the air conditioning apparatus is activated at time 0. Now, since the indoor temperature and humidity are higher than preselected values, both frequencies of the compressor and outdoor fan are increased and operated accordingly so as to firstly decrease the temperature. In this case, the temperature decreases as time lapses, while a relative blowout humidity is not decreased as is the temperature. Thereafter, when the temperature reaches the preselected target value at time $t_1$, the rotation frequency of the the outdoor fan is decreased while the rotation frequency of the compressor is almost kept constant so that the humidity is decreased. Then, the humidity is decreased, whereas the temperature is increased due to characteristics shown in FIG. 6. Thereafter, by the time the humidity reaches the preselected target value at time $t_2$, the rotation frequencies of the compressor and outdoor fan are increased and operated accordingly so as to again decrease the temperature. Thereafter, though the temperature reaches the target value at time $t_3$, the humidity is again higher than the target value. Thereafter, the above situation will be repeated. As a result thereof, the indoor temperature and humidity are ever unstable, so that comfortability is lost in an indoor space.

In contrast, the present invention employing the cross control will be described with reference to FIGS. 4A and 4B in view of FIGS. 6A and 6B. At time 0, the air conditioning is activated. Since the indoor temperature is higher than the preselected value, the rotation frequencies of the compressor and the outdoor fan are increased in order to decrease the room temperature. Then, by having increased the rotation frequency of the outdoor fan, the humidity is lowered rather slowly. Thus, the rotation frequencies of the compressor and outdoor fan are optimally controlled by controllers 23, 24 beforehand so that the humidity is decreased even though the outdoor fan 6 is operated. As a result thereof, the temperature and humidity will reach the target values as quickly as possible. After the temperature and humidity reach the target values at time $t_4$, controllers 23, 24 optimally adjust the rotation frequencies of the compressor and the outdoor fan in a manner of offsetting inherent nature caused within the apparatus, in order to maintain the room temperature and humidity at constant values.

Figure 3:
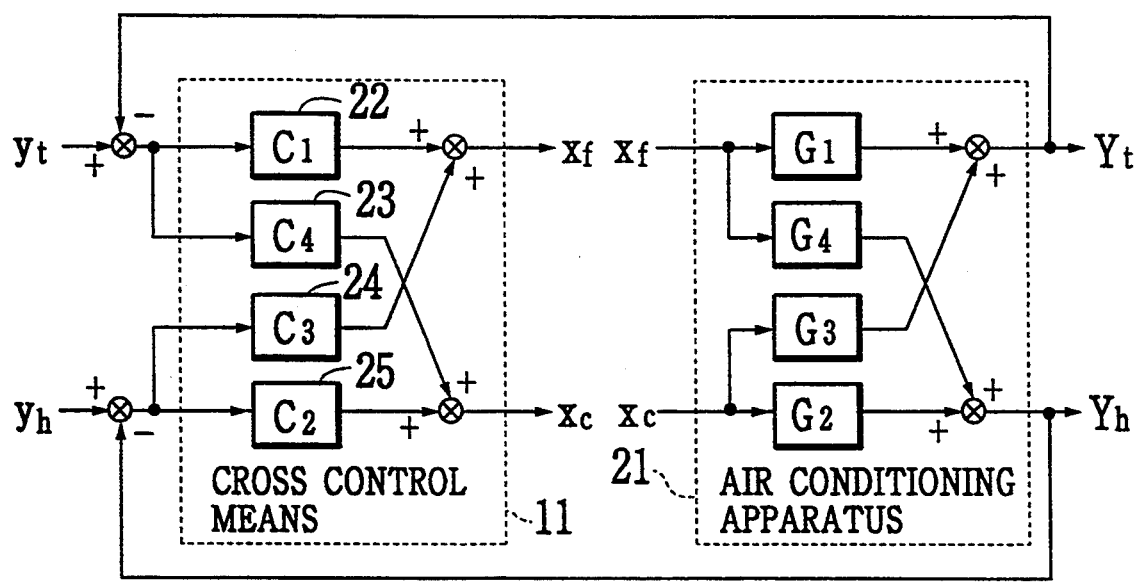
FIG. 3 is a schematic diagram showing operation of the cross control mechanism.

With reference to FIG. 3, adjustment operation realized by controllers 23, 24, that is, cross control operation by cross control means 11 will be described by using following equations.

Referring to FIG. 3, $y_t$ and $y_h$ indicate the indoor temperature setting signal and the indoor humidity setting signal, respectively. $X_f$ and $X_c$ designate a control signal for the rotation frequency of the outdoor fan and a control signal for rotation frequency of the compressor, respectively. $Y_t$ and $Y_h$ indicate the indoor temperature signal and the indoor humidity signal, respectively. $C_1$ through $C_4$ are cross control transfer functions in cross control means 11, whereas $G_1$ through $G_4$ indicate cooling cycle transfer functions in air conditioning apparatus 21.

Now, the following matrices (1) and (2) represent control operation Of the indoor temperature and indoor humidity determined by $X_f$ and $X_c$ in the air conditioning apparatus 21, and processing operation of $X_f$ and $X_c$ obtained by comparison of $y_t$ and $Y_t$ and comparison of $y_h$ and $Y_h$ in the cross control means 11.

$$\begin{pmatrix} Y_t \\ Y_h \end{pmatrix} = \begin{pmatrix} G1 & G3 \\ G4 & G2 \end{pmatrix} \begin{pmatrix} X_f \\ X_c \end{pmatrix} \quad (1)$$

$$\begin{pmatrix} X_f \\ X_c \end{pmatrix} = \begin{pmatrix} C1 & C3 \\ C4 & C2 \end{pmatrix} \begin{pmatrix} y_t - Y_t \\ y_h - Y_h \end{pmatrix} \quad (2)$$

Substituting (2) for (1), $$\begin{pmatrix} Y_t \\ Y_h \end{pmatrix} = \begin{pmatrix} G1 & G3 \\ G4 & G2 \end{pmatrix} \begin{pmatrix} C1 & C3 \\ C4 & C2 \end{pmatrix} \begin{pmatrix} y_t - Y_t \\ y_h - Y_h \end{pmatrix} \quad (3)$$

When equation (3) is solved with respect to $$\begin{pmatrix} Y_t \\ Y_h \end{pmatrix},$$

we obtain $$\begin{pmatrix} Y_t \\ Y_h \end{pmatrix} = \begin{pmatrix} A1 & A2 \\ A3 & A4 \end{pmatrix} \begin{pmatrix} y_t \\ y_h \end{pmatrix} \quad (4)$$

In equation (4), cross-control-means transfer functions C1 through C4 are determined so that cross control portion (A2, A3) becomes (0, 0). Thereby, the indoor temperature and the indoor humidity are optimally controlled in a cross controlling manner. Accordingly, comfortability in the indoor space is significantly improved.

By employing the above construction, both the control signal for the rotation frequency of the outdoor fan and the control signal for the rotation frequency of the compressor are calculated in the cross control means based on both the compared values of the indoor-temperature setting signal and the indoor-temperature signal, and the compared values of the indoor-humidity setting signal and the indoor-humidity signal. Thereby, the rotation frequencies of the outdoor fan and the compressor are controlled in a manner that the interference inherent between the indoor temperature and humidity is cancelled out against each other. As a result thereof, both the indoor temperature and the indoor humidity are controlled optimally with well-conditioned respondence and stability.

Figure 7:
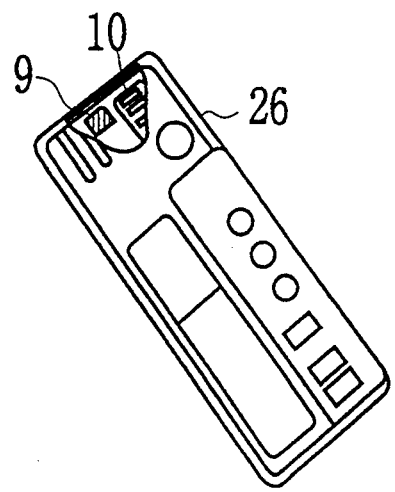
FIG. 7 shows an example where indoor-temperature detecting means 9 and indoor-humidity detecting means 10 are provided in remote control unit 26.
Figure 8:
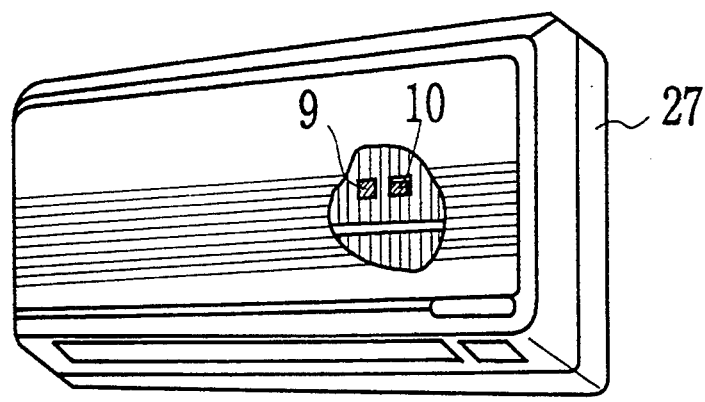
FIG. 8 shows another example where indoor-temperature detecting means 9 and indoor-humidity detecting means 10 are provided in an indoor air-suction portion.
Figure 9:
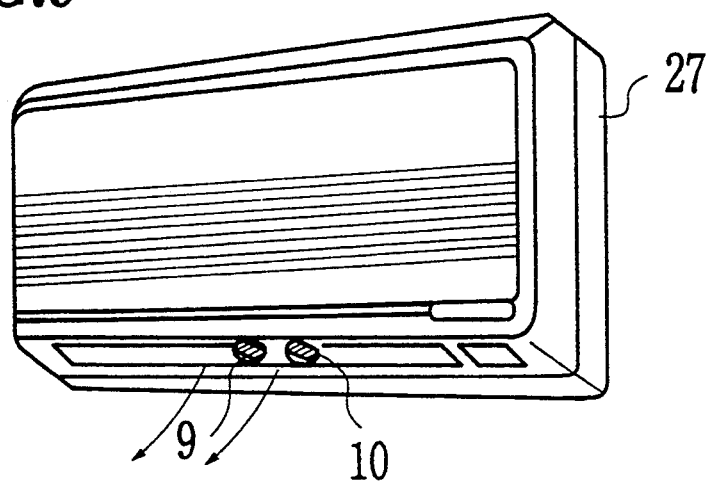
FIG. 9 shows still another example where indoor-temperature detecting means 9 and indoor-humidity detecting means 10 are provided in an air blowout portion of indoor unit 27.

FIGS. 7, 8 and 9 show examples where means 9 for detecting indoor temperature and means 10 for detecting indoor humidity are provided in different places.

FIG. 7 shows an example where indoor-temperature detecting means 9 and indoor-humidity detecting means 10 are provided in remote control unit 26. In this case, the temperature and humidity in close proximity of a user are detected, so that the area surrounding the user is particularly made pleasant and comfortable.

FIG. 8 shows another example where indoor-temperature detecting means 9 and indoor-humidity detecting means 10 are provided in an indoor air-suction portion. In this case, a whole room space is made pleasant and comfortable.

FIG. 9 shows still another example where indoor-temperature detecting means 9 and indoor-humidity detecting means 10 are provided in an air blowout portion of indoor unit 27. In this case, changes in the air-blowout temperature and humidity are rather big, so that controllability can be easily obtained.

It shall be appreciated that indoor-temperature detecting means 9 and indoor-humidity detecting means 10 are provided in all three spots (remote control unit 26, the indoor air-suction portion and the air blowout portion) so that detecting area can be freely selected and switched depending on an intended purpose of the user.

Moreover, cross control means 11 may be comprised of controllers 22-25 which utilize a fuzzy reasoning and so on. In this case, the above-described matrices (1)-(4) are processed by the fuzzy reasoning. When controlled by the fuzzy reasoning technique, quick response can be obtained in a flexible manner even though a load such as a room size is changed.

In summary, by employing the present invention, the control signal for the rotation frequency of the outdoor fan and the control signal for the rotation frequency of the compressor are processed based on the respective comparisons of the indoor temperature setting signal and indoor temperature signal, and indoor humidity setting signal and indoor humidity signal by the cross control means. Thus, the the rotation frequencies of the outdoor fan and compressor are controlled by the control signal for the rotation frequency of the outdoor fan and the control signal for the rotation signal of the compressor so that the indoor temperature as well as the indoor humidity reach promptly the preselected target values of temperature and humidity. After the indoor temperature and humidity have reached the preselected target values of temperature and humidity, the temperature and humidity thus obtained are stabilized so as to improve comfortability in the indoor space.

By providing the indoor-temperature detecting means and the indoor-humidity detecting means in the remote control unit, the temperature and humidity around the user are detected so as to particularly give pleasantness around the user.

By providing the indoor-temperature detecting means and the indoor-humidity detecting means in the indoor air-suction portion of the indoor unit, the whole room can be uniformly made comfortable.

By providing the indoor-temperature detecting means and the indoor-humidity detecting means in the indoor air-blowout portion of the indoor unit, easy controllability can be obtained since the blowout air presents a rather significant change in temperature and humidity thereof.

When the cross control means is processed based on the fuzzy reasoning in a case where the load such as room size is changed, for instance, the quick control respondency corresponding to the change can be desirably obtained.

Figure 10:
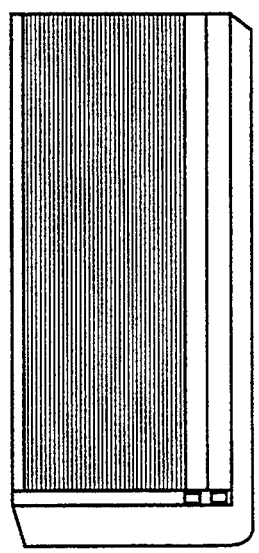
FIG. 10 shows a perspective view of a window-type air conditioning apparatus.
Figure 11:
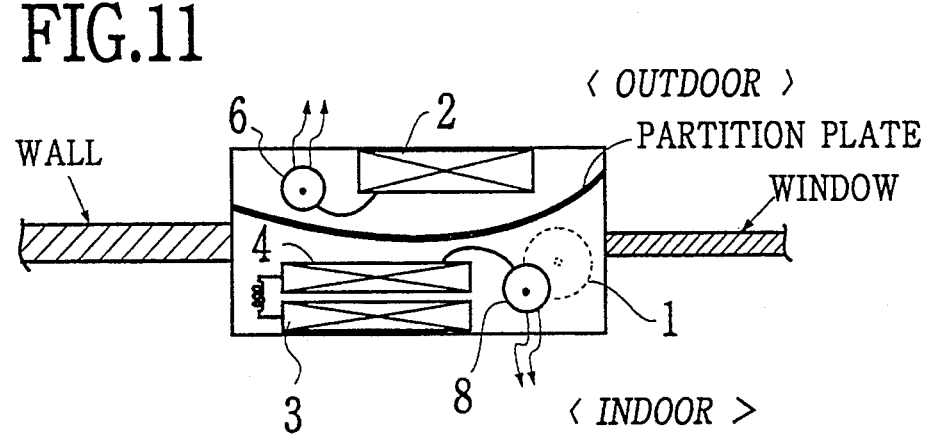
FIG. 11 shows a top view of the apparatus shown in FIG. 10.
Figure 12:
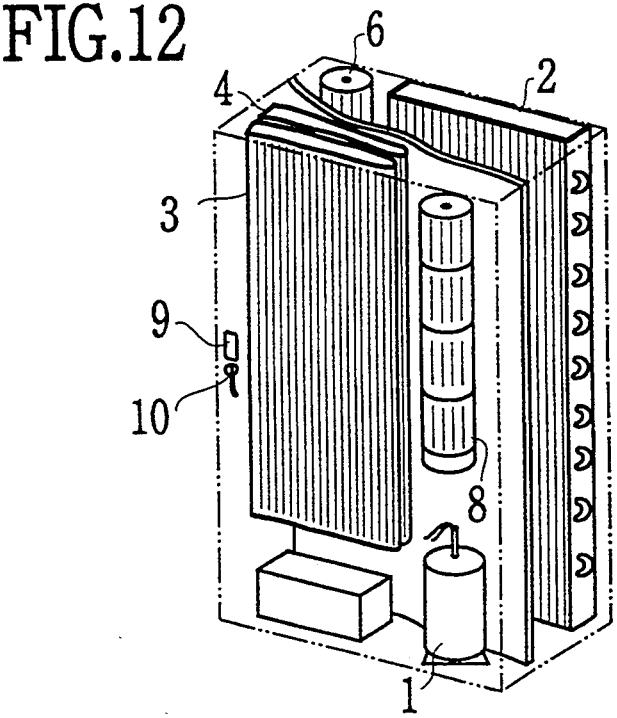
FIG. 12 shows an internal construction of the apparatus shown in FIG. 10.

Similarly, the present invention may be employed to a window-type air conditioning apparatus, as shown in FIG. 10, FIG. 11 and FIG. 12.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. An air conditioning apparatus for use with cycle dry, comprising:
    an outdoor heat exchanger;
    fan means for blowing air to the outdoor heat exchanger;
    adjusting means, connected to the outdoor heat exchanger, for adjusting flow rate of refrigerant;
    a first indoor heat exchanger and a second indoor heat exchanger connected to the adjusting means;
    compressing means which is connected both to the first and second indoor heat exchangers and the outdoor heat exchanger, and which is controllable by an inverter unit;
    detecting means for detecting temperature and humidity indoors; and
    cross control means for determining rotation frequencies of the fan means and the inverter unit by comparing data obtained from the detecting means with predetermined values of temperature and humidity indoors.

2. The apparatus of claim 1, wherein the detecting means is provided in a remote control unit of the apparatus.

3. The apparatus of claim 1, wherein the detecting means is provided in an indoor air suction portion of the apparatus.

4. The apparatus of claim 1, wherein the detecting means is provided in an indoor air blowout portion of the apparatus.

5. The apparatus of claim 1, wherein the cross control means includes a processing based on fuzzy reasoning.

* * * * *